April 7, 1931.  S. SERA  1,800,110
RIM TOOL
Filed Sept. 13, 1929  2 Sheets-Sheet 1
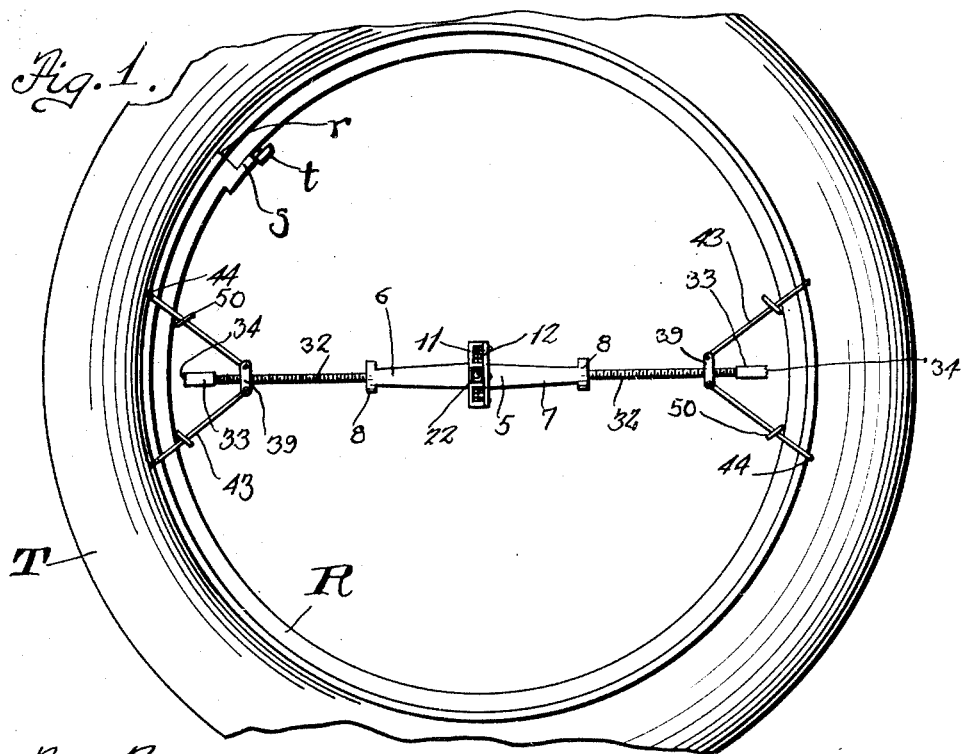
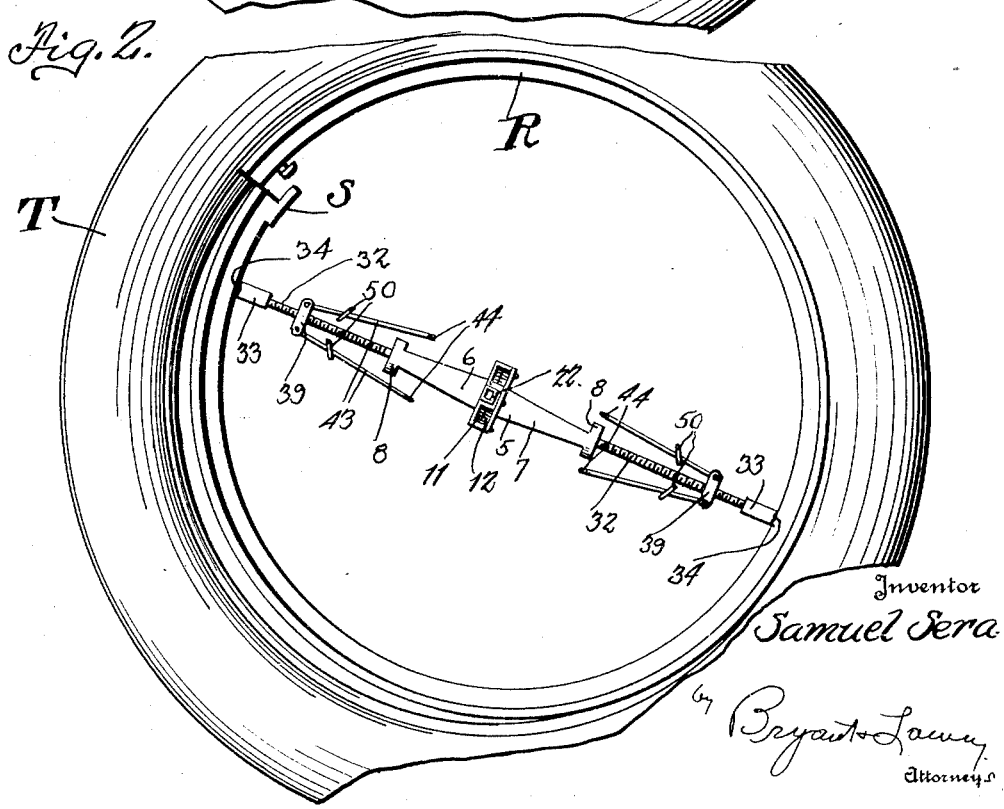
Inventor
Samuel Sera
by Bryant+Lowry
Attorneys

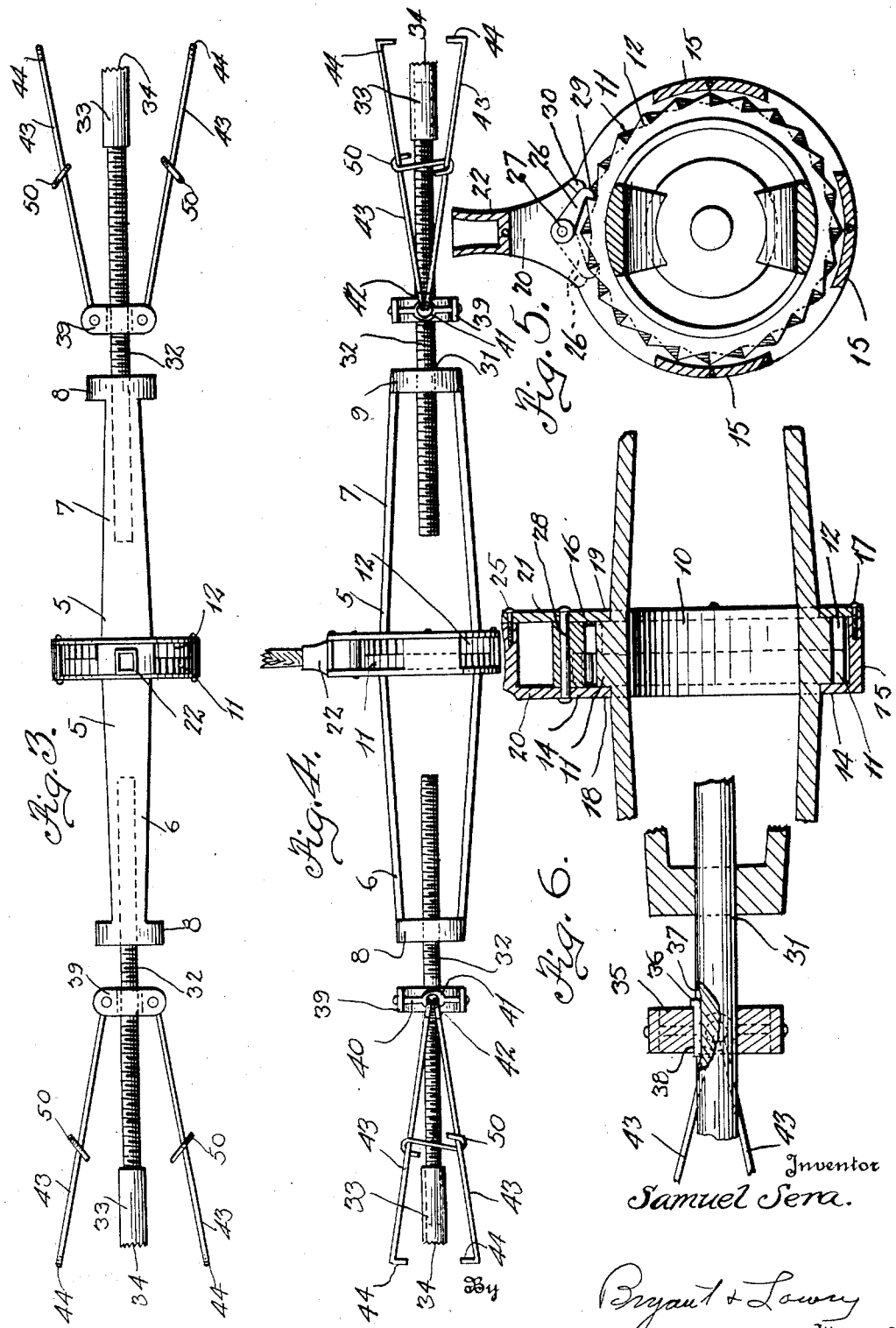

Patented Apr. 7, 1931

1,800,110

UNITED STATES PATENT OFFICE

SAMUEL SERA, OF ERIE, PENNSYLVANIA

RIM TOOL

Application filed September 13, 1929. Serial No. 392,374.

This invention relates to improvements in rim tools of the type employed for contracting and expanding a vehicle wheel rim to remove the tire.

The primary object of this invention is to provide a device of the above mentioned character, having novel means for engaging the rim for expanding and contracting the same.

A further object of this invention is to provide a novel means such as a ratchet connection between the handle and turnbuckle for facilitating the quick operation of the turnbuckle in a clockwise and counterclockwise direction.

Heretofore, turnbuckles have been proposed as means for contracting and expanding vehicle wheel rims having means for engaging the rim attached thereto. Such devices usually employ rim engaging hooks which may be used to contract the rim, such devices are disadvantageous due to the length of time consumed in operation and placing the hooks in their operative positions.

It is proposed to overcome the above disadvantages by employing hooks which may be readily placed in position and means for operating or contracting the hooks by a ratchet arrangement whereby the hooks may be brought together more quickly.

Other objects and advantages of the invention will become apparent during the course of the following description forming a part of this specification.

Referring to the drawings:—

Figure 1 is a plan view of the invention showing the same in operative position upon a vehicle wheel rim for contracting the rim whereby the tire may be removed;

Figure 2 is a similar view showing the parts in their respective positions relative to a vehicle rim for expanding the rim into its locked position;

Figure 3 is a longitudinal side elevational view of the invention showing the arrangement of the rim engaging hooks relative to the rim expanding and engaging feet;

Figure 4 is a longitudinal top elevational view of the same showing the general shape of turnbuckle;

Figure 5 is a transverse cross-sectional view through the turnbuckle operating device showing the double ratchet arrangement for rotating the turnbuckle; and Figure 6 is an enlarged longitudinal cross-sectional view further illustrating the ratchet operating device and the locking device for locking the rim engaging hooks from rotation.

In the drawings forming a part of this specification like reference characters are employed to designate like parts throughout the same and the reference character 5, will generally be employed to designate a turnbuckle having a pair of oppositely extending arms 6 and 7, terminating in circular bands 8.

An enlarged band 10, encircles the intermediate portions of the oppositely extending arms 6 and 7, and is provided with two sets of ratchet teeth 11 and 12, projecting in opposite directions, more clearly shown in Fig. 5. A housing is mounted over the opposite ratchet teeth 11 and 12 and comprises a disk 14, having peripheral lugs 15 in circumferential spaced relation to which is secured a corresponding disk 16, held in place by screws 17. It will be noted that the disk like members 14 and 16 are provided with central openings 18 and 19, respectively, presented to the side walls of the enlarged band 10, whereby longitudinal movement of the housing above described is prevented. Extensions 20 and 21 are formed on the disk members 14 and 16 and the extension 20, is formed into handle socket 22, for receiving a wooden or metallic handle as desired. The disk member 16 is further fastened to the disk member 14 by means of a screw 25 passing through the extension 21 and entering a screw threaded opening in the handle socket 22.

Pivoted between the extensions 20, 21 is a double pawl 26 formed on a bearing 27 freely mounted for rotary movement on the pin 28. Opposite teeth engaging hooks 29 and 30 are formed on the pawl 26 for engaging the ratchet teeth 11, and 12 respectively for rotating the turnbuckle 5 in opposite directions by merely swinging the pawl 26 from the full line position to the dotted line position in Figure 5.

In the openings 31, of the bands 8 and 9 is threaded a screw rod 32 having one end provided with a rim engaging foot 33, in the form of a tube having one end threaded on the rod 32 and the opposite end roughened as at 34 to more firmly engage the tire rim while expanding the same.

Mounted intermediate the screw rods 32 is a collar 35, held against rotation thereon by a key 36 received in a keyway 37 on the shaft and a corresponding keyway 38 on the collar 35. The collars 35 are furnished with opposite plates 39 connected by bolts 40 having eyes 41 for receiving the ends 42 of the rim engaging hooks 43. The rim engaging hooks 43 are bent as at 44 to rigidly engage the rim of a vehicle.

It will be noted that each eye 41 is provided with a pair of rim engaging hooks adapted to be held in engagement with the vehicle rim by means of locking devices 50 whereby longitudinal movement of the locking devices will cause each pair of the rim engaging hooks to be moved toward each other.

For the purpose of illustrating the operation of the invention, attention is directed to Figs. 1 and 2 wherein is shown a vehicle tire rim R of the conventional split type upon which is mounted a tire T. The rim R is split as at r and is provided with the usual locking lug s, adapted to engage the catch t. In Fig. 1 the turnbuckle 5 is positioned so that the rim engaging hooks 43 will engage the rim whereby rotation of the handle of the ratchet device in a clockwise direction will cause the screw threaded rods 32 to move toward one another and contact the rim R.

For expanding the rim R, the feet 33 are placed in position as shown in Fig. 2 and the ratchet device rotated in a counter clockwise direction which causes the screw threaded rods 32 to be moved away from one another thereby expanding the tire rim R into engagement with the tire T.

It is to be understood that various changes in the shape, size, and arrangement of parts may be resorted to without departing from the spirit of the invention or the scope of the sub-joined claim.

Having thus described the invention, what I claim is:—

In a tire rim tool of the character described, comprising a pair of axially related screw threaded rods, a frame having screw threaded openings at opposite ends thereof for receiving the screw threaded rods whereby the same will be caused to move toward and away from one another upon rotation of the frame, an annularly enlarged portion formed on the intermediate portion of the frame, two adjacent circular sets of oppositely directed ratchet teeth on the annularly enlarged portion, a housing encasing the enlargement and formed of side plates engaged with opposite edges of the enlargement to be held against longitudinal movement, connecting means between the side plates including a long pin, a reversible pawl pivoted on the pin between the side plates for relative engagement with the two sets of ratchet teeth, a handle attachment for the housing and tire rim engaging devices secured to the other ends of the screw threaded rods whereby rotation of the ratchet arrangement may be caused in both directions for causing the screw threaded rods and tire rim engaging devices to be moved toward and away from each other.

In testimony whereof I affix my signature.

SAMUEL SERA.